UNITED STATES PATENT OFFICE.

WILLIAM B. YOUNG, OF GOLDEN, COLORADO, ASSIGNOR TO HIMSELF, GREGORY BOARD, AND F. E. EVERETT, OF SAME PLACE.

IMPROVEMENT IN PROCESSES FOR SEPARATING COPPER AND THE PRECIOUS METALS FROM COPPER MATTE.

Specification forming part of Letters Patent No. 192,401, dated June 26, 1877; application filed October 18, 1876.

*To all whom it may concern:*

Be it known that I, WILLIAM B. YOUNG, of the town of Golden, county of Jefferson, in the State of Colorado, have invented a new and useful Process for Separating Copper and the Precious Metals from Copper Matte; and I do hereby declare that the following is a full, clear, and exact description thereof.

My invention has for its object a cheaper and more rapid process for separating copper, gold, and silver from copper matte than has been hitherto known or used.

The mode of conducting my process is as follows: The copper matte produced in smelting establishments is crushed to the finest powder, mixed with chloride of sodium in proper proportions, which is determined by the amount of copper in the matte to be treated. It is then roasted in a reverberatory furnace or roasting-oven at a dull-red heat, till the copper has been converted into a chloride. The matte is then drawn from the oven, and chloride of copper dissolved with water. The residuum in the dissolving-tank containing the gold and silver is passed direct to a blast-furnace in connection with the ordinary smelting of lead ores, when the gold and silver of the residuum pass to the lead and are drawn from the furnace as lead bullion, ready for separation by cupelling or other convenient means or methods. The copper in solution is passed over copper plates, and precipitates any silver that may be in solution; then over iron plates or scrap-iron, to precipitate the copper, as cement copper, and cast into ingots, ready for market.

It is well known that the ordinary or common method of separating the metals referred to is to roast the matte until the copper is converted into an insoluble oxide, when the silver is in a condition of soluble sulphate. The copper and gold remaining are then separated, generally by dissolving the copper in sulphuric acid, or by slagging off the copper as a silicate in a reverberatory furnace, and subsequently treating the silicate of copper by smelting for copper. Both of these processes are slow and expensive, and require the greatest degree of skilled labor to conduct them properly.

It will be observed that by my process no skilled labor is needed beyond the common furnace-hands, which renders it very expeditious and inexpensive, saving at least fifty per cent. cost of reducing copper matte over the common or ordinary method. And, further, matte always contains a percentage of iron, which becomes converted into an oxide by the roasting when converting the copper of the matte into a chloride. And the oxide of iron, being in the residuum of the tank with the gold and silver, becomes a valuable flux, as added to the blast-furnace, as before mentioned.

What I claim as my invention, and desire to secure by Letters Patent of the United States, is—

The process of separating copper and the precious metals from copper matte, which consists in roasting the pulverized matte with common salt, dissolving out the chloride of copper with water, and smelting the residue with lead ores, to obtain gold and silver bullion, substantially as herein set forth.

WILLIAM B. YOUNG.

Witnesses:
CHARLES ROGERS,
THOS. KILVERT.